(12) United States Patent
Lee et al.

(10) Patent No.: US 8,741,473 B2
(45) Date of Patent: Jun. 3, 2014

(54) POUCH-TYPE LITHIUM SECONDARY BATTERY

(75) Inventors: Ho-Chun Lee, Daejeon (KR); Jeong-Ju Cho, Daejeon (KR); Jong-Ho Jeon, Daejeon (KR)

(73) Assignee: LG Chem, Ltd. (KR)

( * ) Notice: Subject to any disclaimer, the term of this patent is extended or adjusted under 35 U.S.C. 154(b) by 410 days.

(21) Appl. No.: 12/810,541

(22) PCT Filed: Dec. 31, 2008

(86) PCT No.: PCT/KR2008/007881
§ 371 (c)(1), (2), (4) Date: Jun. 25, 2010

(87) PCT Pub. No.: WO2009/084928
PCT Pub. Date: Jul. 9, 2009

(65) Prior Publication Data
US 2010/0279168 A1    Nov. 4, 2010

(30) Foreign Application Priority Data
Jan. 2, 2008 (KR) .................. 10-2008-0000393

(51) Int. Cl.
*H01M 2/02* (2006.01)
*H01M 6/16* (2006.01)

(52) U.S. Cl.
USPC ........................ 429/163; 429/324; 429/326

(58) Field of Classification Search
None
See application file for complete search history.

(56) References Cited

U.S. PATENT DOCUMENTS 5,256,504 A    10/1993  Okuno et al.
5,284,722 A    2/1994   Sugeno
5,296,319 A    3/1994   Bito et al.
5,474,862 A *  12/1995  Okuno et al. ............. 429/332

(Continued)

FOREIGN PATENT DOCUMENTS

CN    1560953 A    1/2005
CN    1845372 A    10/2006

(Continued)

OTHER PUBLICATIONS

International Search Report, PCT/KR2008/007881, dated Aug. 20, 2009.

(Continued)

*Primary Examiner* — Ula C Ruddock
*Assistant Examiner* — Daniel Gatewood
(74) *Attorney, Agent, or Firm* — Lerner, David, Littenberg, Krumholz & Mentlik, LLP

(57) ABSTRACT

A pouch-type lithium secondary battery includes an electrode assembly having an anode made of carbon material capable of occluding or emitting lithium ions, a cathode made of lithium-containing oxide, and a separator interposed between the cathode and the anode for electrical insulation therebetween; a pouch-type case made of sheet to provide a space receiving the electrode assembly; and a non-aqueous electrolyte injected into the electrode assembly. The non-aqueous electrolyte is a non-linear carbonate-based non-aqueous electrolyte including a lithium salt, (a) a cyclic carbonate compound, and (b) a linear ester compound selected from propionate-based compound, methyl butyrate, and propyl acetate, or their mixtures. During $LiPF_6$ IM dissolution, the non-aqueous electrolyte has an ion conductivity of 9 mS/cm or above at about 23° C. This pouch-type lithium secondary battery ensures excellent high-rate discharging characteristics and solves swelling problems associated with a pouch-type lithium secondary battery.

13 Claims, 1 Drawing Sheet

(56) References Cited

U.S. PATENT DOCUMENTS

| | | |
|---|---|---|
| 6,942,948 B2 | 9/2005 | Takehara et al. |
| 7,052,803 B2 | 5/2006 | Kato et al. |
| 7,083,878 B2 * | 8/2006 | Kotato et al. ............ 429/338 |
| 7,144,660 B2 | 12/2006 | Shima et al. |
| 7,223,502 B2 | 5/2007 | Onuki |
| 7,235,334 B2 | 6/2007 | Kim et al. |
| 7,261,979 B2 * | 8/2007 | Gozdz et al. ............ 429/231.95 |
| 2002/0192564 A1 * | 12/2002 | Ota et al. ............ 429/324 |
| 2003/0165733 A1 | 9/2003 | Takehara et al. |
| 2004/0072080 A1 | 4/2004 | Iwanaga et al. |
| 2004/0146785 A1 | 7/2004 | Mizutani et al. |
| 2004/0229128 A1 | 11/2004 | Noh |
| 2005/0000086 A1 * | 1/2005 | Mizutani et al. ............ 29/623.1 |
| 2005/0053843 A1 | 3/2005 | Takahashi |
| 2005/0164094 A1 | 7/2005 | Kotato et al. |
| 2006/0121356 A1 | 6/2006 | Jan et al. |
| 2006/0194115 A1 | 8/2006 | De Jonghe et al. |
| 2006/0228625 A1 | 10/2006 | Kawashima |
| 2007/0009806 A1 | 1/2007 | Kim |
| 2007/0059606 A1 | 3/2007 | Lee et al. |
| 2007/0166617 A1 | 7/2007 | Gozdz et al. |
| 2009/0170006 A1 | 7/2009 | Abe et al. |
| 2010/0015514 A1 | 1/2010 | Miyagi et al. |
| 2010/0119956 A1 | 5/2010 | Tokuda et al. |

FOREIGN PATENT DOCUMENTS

| | | | |
|---|---|---|---|
| EP | 1009057 A1 | 6/2000 | |
| EP | 1195833 A1 | 4/2002 | |
| EP | 1276165 A1 | 1/2003 | |
| EP | 1939971 A1 | 7/2008 | |
| EP | 1030399 B1 | 5/2009 | |
| JP | 3032338 A | 2/1991 | |
| JP | 4-284374 A | 10/1992 | |
| JP | 5-182689 A | 7/1993 | |
| JP | 05-242910 A | 9/1993 | |
| JP | 6-020721 A | 1/1994 | |
| JP | 7-153486 A | 6/1995 | |
| JP | 2007-254434 | 10/1995 | |
| JP | 8241731 A | 9/1996 | |
| JP | 08-339824 A | 12/1996 | |
| JP | 2003132888 A | 5/2003 | |
| JP | 2003243031 A | 8/2003 | |
| JP | 2004241339 A | 8/2004 | |
| JP | 2004281073 A | 10/2004 | |
| JP | 2005267938 A | 9/2005 | |
| JP | 2007019012 A | 1/2007 | |
| JP | 2007-141831 A | 6/2007 | |
| KR | 100342605 A | 6/2002 | |
| KR | 10-0567113 A | 2/2004 | |
| KR | 20050025101 A | 3/2005 | |
| KR | 20060033920 A | 4/2006 | |
| KR | 20070019965 A | 2/2007 | |
| KR | 20070031806 A | 3/2007 | |
| KR | 100833041 | 5/2008 | |
| WO | 03044882 A1 | 5/2003 | |
| WO | 2004023589 A1 | 3/2004 | |
| WO | 20071020876 A1 | 2/2007 | |
| WO | 2007055087 A1 | 5/2007 | |
| WO | 20071064076 A1 | 6/2007 | |
| WO | 2008023951 A1 | 2/2008 | |
| WO | 2008044850 A1 | 4/2008 | |
| WO | 2008050971 A1 | 5/2008 | |

OTHER PUBLICATIONS

Extended European Search Report for Application No. EP08766212.8 dated Jul. 20, 2012.

International Search Report, PCT/KR2008/003250, dated Aug. 22, 2008.

International Search Report, PCT/KR2008/003328, dated Sep. 24, 2008.

Ohta et al., "Relationship between carbonaceous materials and electrolyte in secondary lithium-ion batteries", Journal of Power Sources 54 (1995) 6-10.

U.S. Appl. No. 12/602,239.

U.S. Appl. No. 12/663,597.

* cited by examiner

POUCH-TYPE LITHIUM SECONDARY BATTERY

CROSS REFERENCE TO RELATED APPLICATIONS

The present application is a national phase entry under 35 U.S.C. §371 of International Application No. PCT/KR2008/007881, filed Dec. 31, 2008, published in English, which claims priority from Korean Patent Application No. 10-2008-0000393, filed Jan. 2, 2008, all of which are incorporated herein by reference.

TECHNICAL FIELD

The present invention relates to a pouch-type lithium secondary battery having a pouch-type case formed with a sheet.

BACKGROUND ART

Recently, interests in energy storage technologies have increased. As the energy storage technologies are extended to such devices as cellular phones, camcorders and notebook PCs, and further to electric vehicles, the demand for a high energy density battery used as a power source of such an electronic device has increased. A lithium ion secondary battery is one of the most satisfactory batteries, and numerous studies towards improvements are now in progress actively.

A lithium secondary battery may be manufactured with various shapes. Representative examples include an angled lithium secondary battery, a cylindrical lithium secondary battery and a pouch-type lithium secondary battery.

As shown in FIG. 1, a pouch-type lithium secondary battery 10 generally includes an electrode assembly 11, and a case 12 defining a space for receiving the electrode assembly 11. The electrode assembly 11 includes an anode made of carbon material capable of occluding or emitting lithium ions, a cathode made of lithium-containing oxide, and a separator interposed between the cathode and the anode to electrically insulate them. Cathode and anode taps are respectively drawn from one edges of the cathode and the anode of the electrode assembly 11 to configure tap units 13, which are electrically connected to each other with being aggregated on each electrode plate. The tap units 13 are respectively welded with electrode terminals, which may be connected to an external terminal.

The pouch-type lithium secondary battery 10 includes the pouch-type case 12 made of a sheet, which sheet is formed by laminating a polymer film on a metal sheet made of aluminum, for example. The case 12 has a space in which the electrode assembly 11 may be placed, and conventionally upper and lower cases are releasably joined to each other. In the pouch-type lithium secondary battery 10 configured as above, the electrode assembly 11 is installed in the pouch-type case 11 having a space, and then an electrolyte is injected therein. And then, heat and pressure are applied around the pouch-type case 12 to firmly seal the pouch-type case 12, thereby completing the pouch-type lithium secondary battery 10.

As mentioned above, the pouch-type lithium secondary battery employs a pouch-type case made of sheet, so it is possible to fabricate a light lithium secondary battery in various shapes through a simple manufacturing process. However, since the pouch-type case is used, the lithium secondary battery therein may be more vulnerable to swelling due to increased inner pressure as compared to a cylindrical or angled battery. Along with the swelling, the thickness of the battery is increased, causing problems in electronics such as a cellular phone or a notebook and also creating serious influences on the stability and performance of the battery.

This swelling of the battery is more serious in a lithium secondary battery to which a non-aqueous electrolyte containing a dimethyl carbonate is injected.

For example, Japanese Patent No. 3,032,338 discloses a non-aqueous electrolyte secondary battery containing a ternary system organic solvent composed of ethylene carbonate, dimethyl carbonate and methyl propionate. The non-aqueous electrolyte having dimethyl carbonate as a linear carbonate exhibits good high-rate discharging characteristics. However, since dimethyl carbonate has a low boiling point, the battery may significantly swell if the battery is overheated or left alone at a high temperature. If ethyl methyl carbonate or dimethyl carbonate is added as linear carbonate or if only a small amount of dimethyl carbonate is added, the swelling problem of the battery may improve, but high-rate discharging characteristics deteriorate.

DISCLOSURE OF INVENTION

Technical Problem

The present invention is designed to solve the problems of the prior art, and therefore it is an object of the present invention to provide a pouch-type lithium secondary battery, which exhibits excellent high-rate discharging characteristics and also solves the swelling problem of the battery, thereby overcoming the weak points of a pouch-type battery.

Technical Solution

In order to accomplish the above object, the present invention provides a pouch-type lithium secondary battery, which includes an electrode assembly having an anode made of carbon materials capable of occluding or emitting a lithium ion, a cathode made of lithium-containing oxide, and a separator interposed between the cathode and the anode for electrical insulation between them; a pouch-type case made of a sheet to give a space in which the electrode assembly is housed; and a non-aqueous electrolyte injected into the electrode assembly, wherein the non-aqueous electrolyte is a non-linear carbonate-based non-aqueous electrolyte including a lithium salt, (a) a cyclic carbonate compound, and (b) a linear ester compound selected from the group consisting of propionate-based compound, methyl butyrate, and propyl acetate, or their mixtures, and wherein, during $LiPF_6$ 1M dissolution, the non-aqueous electrolyte has an ionic conductivity of 9 mS/cm or above at about 23° C.

In the pouch-type lithium secondary battery according to the present invention, the volume ratio (a:b) of the (a) component, namely a cyclic carbonate compound, and the (b) component, namely a linear ester compound, is preferably about 2:8 to about 4:6.

In the pouch-type lithium secondary battery according to the present invention, the cyclic carbonate compound may be any one material or a mixture of at least two materials selected from the group consisting of ethylene carbonate, propylene carbonate, fluoroethylene carbonate, and butylene carbonate. Also, the ethyl propionate-based compound is any one material or a mixture of at least two materials selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

MODE FOR THE INVENTION

Figure 1:
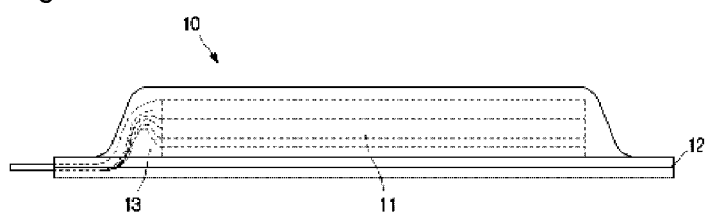
FIG. 1 is a sectional view schematically showing a general pouch-type lithium secondary battery.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

As explained above, a pouch-type lithium secondary battery according to the present invention essentially employs a predetermined mixed organic solvent having high ionic conductivity, without using a linear carbonate compound. That is to say, the non-aqueous electrolyte injected into the pouch-type lithium secondary battery according to the present invention is a non-linear carbonate-based non-aqueous electrolyte including a lithium salt, (a) a cyclic carbonate compound, and (b) a linear ester compound such as propionate-based compound, methyl butyrate, and propyl acetate, and their mixtures. During $LiPF_6$ 1M dissolution, the non-aqueous electrolyte has an ionic conductivity of 9 mS/cm or above at about 23° C.

The cyclic carbonate compound easily dissociates lithium salts in an electrolyte, which contributes to improvement of the charge/discharge capacity of a battery. The cyclic carbonate compound may be any one material or a mixture of at least two materials selected from the group consisting of ethylene carbonate, propylene carbonate, fluoroethylene carbonate, and butylene carbonate. In particular, a mixture of ethylene carbonate (or, fluoroethylene carbonate) or ethylene carbonate (or, fluoroethylene carbonate) and propylene carbonate has a high dielectric constant, so it more easily dissociates lithium salts in an electrolyte.

The propionate-based compound used in the present invention may be propionate-based ester compound expressed by the following Chemical Formula 1:

Chemical Formula 1

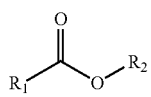

where $R_1$ and $R_2$ are independently a linear or branched $C_{1-6}$ alkyl group, and $R_1$ and $R_2$ may be unsubstituted or substituted with at least one halogen, respectively.

Non-limiting examples of the propionate-based ester compound expressed by the Chemical Formula 1 include at least one compound selected from the group consisting of methyl propionate-based compound, ethyl propionate-based compound, propyl propionate-based compound, and butyl propionate-based compound. Ethyl propionate-based ester compounds are preferred.

Ethyl propionate-based compounds, methyl butyrate and propyl acetate are linear ester compounds that have a low freezing point and a relatively high boiling point and exhibit excellent low-temperature characteristics. In addition, they exhibit relatively low reactivity to a carbon material anode. Such linear ester compounds are mixed with the above-mentioned cyclic carbonate compound to contribute to improvement of high-rate discharging characteristics of the lithium secondary battery, particularly. That is to say, the linear ester compounds exhibit high ionic conductivity at a normal and low temperature by suitably coordinating lithium ions, thereby improving high-rate discharging characteristics of the battery. In addition, the linear ester compounds show high resistance against decomposition reactions in an electrolyte at the cathode during the battery charging process, so that swelling of the battery is restrained and the life cycle of the battery is improved. Also, since wettability to an electrode is improved, rather than in the case when an ester carbonate solvent alone is used as a non-aqueous electrolyte, its formation of lithium dendrites on the electrode surface is restrained, thereby improving safety of the battery. The linear ester compounds may be used alone or in combination. The ethyl propionate-based compound may employ ethyl propionate, ethyl 3-fluoropropionate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate, i alone or in combination.

Figure 2:
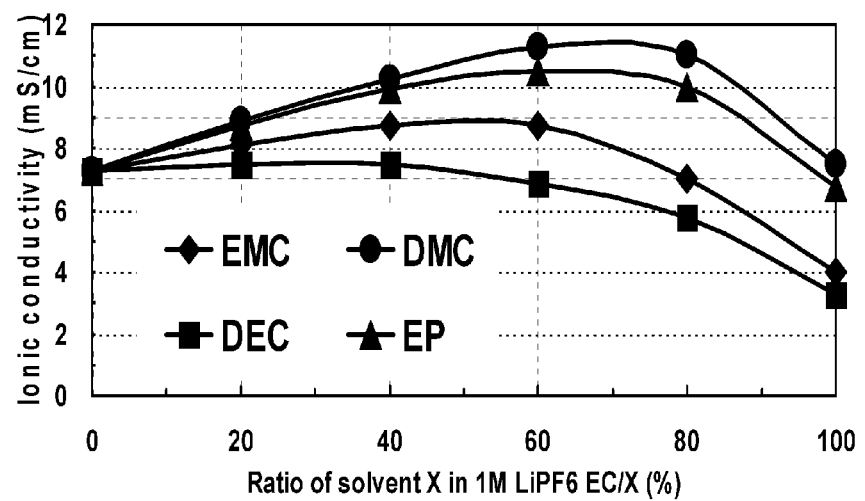
FIG. 2 is a graph showing ion conductivity of a non-aqueous electrolyte obtained by dissolving 1M of $LiPF_6$ in a mixed organic solvent of ethylene carbonate and other organic solvent (x), which is measured at 23° C. according to a composition ratio (%) of the mixed organic solvent.

The non-aqueous electrolyte of the present invention, as explained above, has an ionic conductivity of 9 mS/cm or above at about 23° C. during 1M dissolution of $LiPF_6$. That is to say, as shown in FIG. 2, in the non-aqueous electrolyte containing (a) a cyclic carbonate compound and (b) a specific linear ester compound, their ratio is controlled in order to have an ionic conductivity of 9 mS/cm or above at about 23° C. during 1M dissolution of $LiPF_6$ for the improvement of high-rate discharging characteristics. When the ionic conductivity of the non-aqueous electrolyte exceeds 9 mS/cm, it would be understood that the ionic conductivity is substantially at the same level as that of a mixed organic solvent containing dimethyl carbonate, as distinct from that of the other kinds of linear carbonates. In this aspect, a volume ratio (a:b) of the (a) component, namely a cyclic carbonate compound, and the (b) component, namely a linear ester compound, is preferably in the range from 2:8 to 4:6.

The non-aqueous electrolyte of the lithium secondary battery according to the present invention employs a cyclic carbonate compound as a carbonate compound and a non-linear ester compound, namely a non-linear carbonate-based organic solvent. Thus, the linear carbonate compound is not added so as to improve charging/discharging efficiency of the lithium secondary battery, but a small amount of linear carbonate compound may be included without departing from the purpose of the present invention.

In the non-aqueous electrolyte of the lithium secondary battery according to the present invention, the lithium salt included therein as an electrolyte may employ any one commonly used in an electrolyte for a lithium secondary battery. Non-limiting representative examples of the lithium salt may further include $LiPF_6$ $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$. In addition, other compounds such as lactone, ether, ester, acetonitrile, lactam, and ketone may be added to the non-aqueous electrolyte of the lithium secondary battery without departing from the purpose of the present invention.

The pouch-type lithium secondary battery of the present invention has a structure as shown in FIG. 1. That is to say, the pouch-type lithium secondary battery according to the present invention includes an electrode assembly having an anode made of carbon materials capable of occluding or emitting a lithium ion, a cathode made of lithium-containing oxide, and a separator interposed between the cathode and the anode for electrical insulation between them; a pouch-type case made of a sheet having a space in which the electrode assembly is placed therein; and a non-aqueous electrolyte injected into the electrode assembly. The non-aqueous electrolyte injected into the electrode assembly is already explained above.

The anode made of carbon materials capable of occluding or emitting lithium ions and the cathode made of lithium-containing oxides may employ any material commonly used for manufacturing a lithium secondary battery.

For example, the carbon materials capable of occluding or emitting lithium ions may be low-crystalline carbon or high-crystalline carbon. The low-crystalline carbon includes soft carbon or hard carbon, and the high-crystalline carbon includes natural graphite, Kish graphite, pyrolytic carbon, mesophase pitch based carbon fiber, meso-carbon microbeads, mesophase pitches, and high-temperature sintered carbon, such as petroleum or coal tar pitch derived cokes, but it is not limited thereto. The anode may have a binding agent, which may use various kinds of binder polymer such as PVDF-co-HFP HFP (polyvinylidene-co-hexafluoropopylene), polyvinylidenefluoride, poly-acrylonitrile, polymethylmethacrylate, SBR (Styrene-Butadiene Rubber) copolymer, and modified SBR copolymer.

In addition, cathode active materials made of lithium-containing oxide preferably employ a lithium-containing transition metal oxide, for example any one material or a mixture of at least two materials selected from the group consisting of $LiCoO_2$, $LiNiO_2$, $LiMnO_2$, $LiMn_2O_4$, $Li(Ni_aCO_bMn_c)O_2$ ($0 \leq a<1$, $0<b<1$, $0<c<1$, $a+b+c=1$), $LiNi_{1-y}CO_yO_2$, $LiCO_{1-y}Mn_yO_2$, $LiNi_{1-y}Mn_yO_2$ ($0 \leq y<1$), $Li(Ni_aCO_bMn_c)O_4$ ($0<a<2$, $0<b<2$, $0<c<2$, $a+b+c=2$), $LiMn_{2-z}Ni_3O_4$, $LiMn_{2-z}CO_3O_4$ ($0<z<2$), $LiCoPO_4$ and $LiFePO_4$.

The electrode of the pouch-type lithium secondary battery according to the present invention may be manufactured according to a conventional method, for example, which includes adding electrode active material particles and a binder polymer, together with a conductive material and dispersing agent (if required), to a solvent, then coating a current collector with the slurry, and finally compressing and drying it. In addition, the separator interposed between the cathode and the anode may employ common porous polymer films used as a conventional separator, such as a porous polymer film made using an ethylene homopolymer, propylene homopolymer, ethylene/butene copolymer, ethylene/hexene copolymer or ethylene/methacrylate copolymer, in a single layer or in laminate form. In other cases, the separator may be a common porous non-woven fabric such as a non-woven fabric made of glass fiber with a high melt point or polyethylene terephthalate fiber, but it is not limited thereto.

In addition, the pouch-type case receiving the electrode assembly may be made using a common sheet such as a sheet made by laminating a polymer film on a metal sheet made of such as aluminum, for example a sheet made by laminating polyethylene sheets on both surfaces of an aluminum sheet.

Hereinafter, the present invention is explained in more detail based on several Embodiments. However, the following Embodiments may be modified in various ways, and the present invention should not be interpreted as being limited thereto. The following Embodiments are provided for persons having ordinary skill in the art to understand the present invention in a better way.

Embodiment 1

1M of $LiPF_6$ was added to a mixed organic solvent in which ethylene carbonate (EC) and ethyl propionate (EP) are mixed in a volume ratio of 3:7 to prepare a non-aqueous electrolyte.

Then, an electrode assembly was fabricated by interposing a polyethylene porous film between a cathode using $LiCoO_2$ as a cathode active material and an anode using artificial graphite as an anode active material, and then the electrode assembly was placed and sealed in a pouch-type case made of a polypropylene/aluminum/polypropylene film. Here, the non-aqueous electrolyte prepared as above was injected to manufacture a pouch-type lithium secondary battery.

Embodiment 2

A pouch-type lithium secondary battery was manufactured in the same way as in the Embodiment 1, except that methyl butyrate was used instead of ethyl propionate.

Embodiment 3

A pouch-type lithium secondary battery was manufactured in the same way as in the Embodiment 1, except that propyl acetate was used instead of ethyl propionate.

Embodiment 4

A pouch-type lithium secondary battery was manufactured in the same way as in the Embodiment 1, except that the composition of ethylene carbonate and ethyl propionate was changed into a volume ratio of 2:8.

Embodiment 5

A pouch-type lithium secondary battery was manufactured in the same way as in the Embodiment 1, except that the composition of ethylene carbonate and ethyl propionate was changed into a volume ratio of 4:6.

Comparative Example 1

A pouch-type lithium secondary battery was manufactured in the same way as in the Embodiment 1, except that the composition and kind of a mixed organic solvent was changed into ethylene carbonate:dimethyl carbonate=3:7 (volume ratio).

Comparative Example 2

A pouch-type lithium secondary battery was manufactured in the same way as in the Embodiment 1, except that the composition and kind of a mixed organic solvent was changed into ethylene carbonate:ethyl methyl carbonate=3:7 (volume ratio).

Comparative Example 3

A pouch-type lithium secondary battery was manufactured in the same way as in the Embodiment 1, except that the composition and kind of a mixed organic solvent was changed into ethylene carbonate:diethyl carbonate=3:7 (volume ratio).

High-Rate Charging/Discharging Test

The pouch-type batteries manufactured according to the Embodiments 1-5 and the Comparative Examples 1-3 were charged/discharged 3 times at a 0.2 C rate, and subsequently charged at a 0.2 C rate and discharged at a 2 C rate. The measured 0.2 C discharge capacity, 2 C discharge capacity and their capacity ratio are listed in the following Table 1.

Swelling Test at High-Temperature Storage

The pouch-type batteries manufactured according to the Embodiments 1-5 and the Comparative Examples 1-3 were heated from a normal temperature to 90° C. for 1 hour, and then preserved at 90° C. for 4 hours. The increased thickness during the storage at 90° C. for 4 hours is listed in the Table 1.

TABLE 1

|  | Solvent composition | 0.2 C discharge capacity (mAh) | 2 C discharge capacity (mAh) | 2 C/0.2 C capacity ratio (%) | Thickness increase at high-temperature storage (mm) |
| --- | --- | --- | --- | --- | --- |
| Embodiment 1 | EC/EP = 3/7 | 901 | 752 | 83.5 | 0.18 |
| Embodiment 2 | EC/MB = 3/7 | 897 | 746 | 83.2 | 0.14 |
| Embodiment 3 | EC/PA = 3/7 | 898 | 748 | 83.3 | 0.16 |
| Embodiment 4 | EC/EP = 2/8 | 897 | 729 | 81.3 | 0.25 |
| Embodiment 5 | EC/EP = 4/6 | 900 | 743 | 82.6 | 0.15 |
| Comparative Example 1 | EC/DMC = 3/7 | 905 | 758 | 83.8 | 5.56 |
| Comparative Example 2 | EC/EMC = 3/7 | 903 | 634 | 70.2 | 0.22 |
| Comparative Example 3 | EC/DEC = 3/7 | 897 | 503 | 56.1 | 0.03 |

As seen from the Table 1, it would be understood that the pouch-type lithium secondary batteries according to the Embodiments 1 to 5 exhibit good 2 C discharge capacity, which is substantially the same level as the Comparative Example 1 using a mixed organic solvent of ethylene carbonate and dimethyl carbonate, but different from the Comparative Examples 2 and 3. Meanwhile, the pouch-type lithium secondary battery of the Comparative Example 1 exhibits greatly increased thickness at a high-temperature storage and thus exhibits serious swelling. On the other hand, the pouch-type lithium secondary batteries according to the Embodiments 1 to 5 of the present invention exhibit just a small thickness change like the Comparative Examples 2 and 3.

INDUSTRIAL APPLICABILITY

The pouch-type lithium secondary battery of the present invention employs a predetermined mixed organic solvent having high ionic conductivity without using a linear carbonate compound, in order to ensure excellent high-rate discharging characteristics and also solve swelling problems associated with a battery having a pouch-type case.

The invention claimed is:

1. A pouch-type lithium secondary battery, comprising:
an electrode assembly having an anode, a cathode, and a separator interposed between the cathode and the anode for electrical insulation therebetween;
a pouch-type case made of a sheet to provide a space in which the electrode assembly is housed; and
a non-aqueous electrolyte injected into the electrode assembly,
wherein the non-aqueous electrolyte is a non-linear carbonate-based non-aqueous electrolyte including a lithium salt, (a) a cyclic carbonate compound, and (b) a linear ester compound selected from the group consisting of propionate-based compound, methyl butyrate, propyl acetate, and mixtures thereof, and does not contain a linear carbonate compound, and
wherein, during $LiPF_6$ 1M dissolution, the non-aqueous electrolyte has an ionic conductivity of 9 mS/cm or above at about 23° C., wherein a volume ratio (a:b) of the (a) component and (b) component is about 2:8 to about 4:6.

2. The pouch-type lithium secondary battery according to claim 1, wherein the cyclic carbonate compound includes any one material or a mixture of at least two materials selected from the group consisting of ethylene carbonate, propylene carbonate, fluoroethylene carbonate, and butylene carbonate.

3. The pouch-type lithium secondary battery according to claim 1, wherein the propionate-based compound may be propionate-based ester compound expressed by the following Chemical Formula 1:

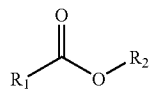

Chemical Formula 1 where $R_1$ and $R_2$ are independently a linear or branched $C_{1-6}$ alkyl group, and $R_1$ and $R_2$ may be unsubstituted or substituted with at least one halogen, respectively.

4. The pouch-type lithium secondary battery according to claim 3, wherein the propionate-based ester compound expressed by the Chemical Formula 1 includes at least one compound selected from the group consisting of methyl propionate-based compound, ethyl propionate-based compound, propyl propionate-based compound, and butyl propionate-based compound.

5. The pouch-type lithium secondary battery according to claim 4, wherein the ethyl propionate-based compound is any one material or a mixture of at least two materials selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

6. The pouch-type lithium secondary battery according to claim 1, wherein the lithium salt includes any one material or a mixture of at least two materials selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$.

7. The pouch-type lithium secondary battery according to claim 1, wherein the anode is made of carbon material capable of occluding or emitting lithium ions.

8. The pouch-type lithium secondary battery according to claim 7, wherein the carbon material capable of occluding or emitting lithium ions is a low-crystalline carbon or high-crystalline carbon.

9. The pouch-type lithium secondary battery according to claim 1, wherein the cathode is made of lithium-containing oxide.

10. The pouch-type lithium secondary battery according to claim 9, wherein the lithium-containing oxide is a lithium-containing transition metal oxide.

11. The pouch-type lithium secondary battery according to claim 10, wherein the lithium-containing transition metal oxide is any one material or a mixture of at least two materials selected from the group consisting of $LiCoO_2$, $LiNiO_2$, $LiMnO_2$, $LiMn_2O_4$, $Li(Ni_aCo_bMn_c)O_2$ ($0 \leq a \leq 1$, $0 \leq b \leq 1$, $0 \leq c \leq 1$, $a+b+c=1$), $LiNi_{1-y}Co_yO_2$, $LiCo_{1-y}Mn_yO_2$, $LiNi_{1-y}Mn_yO_2$ ($0 \leq y < 1$), $Li(Ni_aCo_bMn_c)O_4$ ($0 < a < 2$, $0 < b < 2$, $0 < c < 2$, $a+b+c=2$), $LiMn_2$—, $Ni_3O_4$, $LiMn_2$—, $CO_3O_4$ ($0 < z < 2$). $LiCoPO_4$ and $LiFePO_4$.

12. The pouch-type lithium secondary battery according to claim 1, wherein a ratio of discharge capacity of the battery at 2 C rate to discharge capacity of the battery at 0.2 C rate ranges from 81.3% to 83.5%, and wherein a thickness increase during storage of the battery at 90° C. ranges from 0.14 millimeters (mm) to 0.25 mm.

13. A pouch-type lithium secondary battery, comprising:

an electrode assembly having an anode, a cathode, and a separator interposed between the cathode and the anode for electrical insulation therebetween;

a pouch-type case made of a sheet to provide a space in which the electrode assembly is housed; and a non-aqueous electrolyte injected into the electrode assembly, wherein the non-aqueous electrolyte is a non-linear carbonate-based non-aqueous electrolyte including a lithium salt, (a) a cyclic carbonate compound, and (b) a linear ester compound selected from the group consisting of propionate-based compound, methyl butyrate, propyl acetate, and mixtures thereof, and does not contain a linear carbonate compound, wherein a ratio of discharge capacity of the battery at 2 C rate to discharge capacity of the battery at 0.2 C rate ranges from 81.3% to 83.5%, and wherein a thickness increase during storage of the battery at 90° C. ranges from 0.14 millimeters (mm) to 0.25 mm.

* * * * *